United States Patent
Scheir

(10) Patent No.: US 12,456,127 B1
(45) Date of Patent: *Oct. 28, 2025

(54) ADAPTIVE DIGITAL AUTHENTICATION AND MARKETING DATA TRACKING

(71) Applicant: Peter Scheir, Pacific Beach, CA (US)

(72) Inventor: Peter Scheir, Pacific Beach, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/624,380

(22) Filed: Apr. 2, 2024

Related U.S. Application Data

(63) Continuation of application No. 17/546,236, filed on Dec. 9, 2021, now Pat. No. 11,972,444.

(60) Provisional application No. 63/252,670, filed on Oct. 6, 2021, provisional application No. 63/123,412, filed on Dec. 9, 2020.

(51) Int. Cl.
 *G06Q 30/0201* (2023.01)
 *G06K 19/06* (2006.01)

(52) U.S. Cl.
 CPC ... *G06Q 30/0201* (2013.01); *G06K 19/06037* (2013.01)

(58) Field of Classification Search
 CPC ....... G06Q 10/00–50/00; G06K 1/00–2215/00
 See application file for complete search history.

(56) References Cited

U.S. PATENT DOCUMENTS

| | | | |
|---|---|---|---|
| 9,760,896 B2* | 9/2017 | Ghosh | G06Q 30/0205 |
| 10,546,315 B2* | 1/2020 | Mitchell | G06Q 30/0238 |
| 10,769,667 B2* | 9/2020 | Zavesky | G06Q 30/0269 |
| 10,803,418 B2* | 10/2020 | Ng | H04L 63/083 |
| 10,963,901 B2* | 3/2021 | Bhattacharjee | G06Q 20/387 |
| 11,593,602 B1* | 2/2023 | Bricks | G09F 3/0288 |
| 2006/0047573 A1* | 3/2006 | Mitchell | G06Q 30/0237 |
| | | | 705/14.37 |
| 2012/0187185 A1* | 7/2012 | Sayan | G06Q 30/0601 |
| | | | 235/487 |
| 2013/0197992 A1* | 8/2013 | Bao | G06Q 30/0239 |
| | | | 705/14.43 |
| 2014/0278857 A1* | 9/2014 | Bergman | G06Q 30/0211 |
| | | | 705/14.13 |
| 2014/0304077 A1* | 10/2014 | Wingle | G06Q 30/0241 |
| | | | 705/26.61 |
| 2014/0339120 A1* | 11/2014 | Key | G09F 3/02 |
| | | | 493/54 |
| 2015/0006672 A1* | 1/2015 | Morel | G06Q 30/0269 |
| | | | 709/217 |

(Continued)

*Primary Examiner* — Alan S Miller

(74) *Attorney, Agent, or Firm* — Gugliotta & Gugliotta, LPA

(57) ABSTRACT

A QR management system redirects based on user-definable criteria, user set triggers or change events. A security indicium (printed, adhered label, tag or near field communication device) uses the code to direct to a standard URL or generated personalized URL to a website. The QR codes are assigned individually or allocated to a product range. Each code within the range can direct to a different location. The web page creation system allows the brand owner to populate and customize landing content to which the QR code directs. All scans are tracked and reports data such as product, location, date and time of code use. Real time on demand changes to such consumer's accessible content may be made based on owner defined criteria, which may include number of scans or dates of a scans, time and date or date ranges of each scan.

18 Claims, 20 Drawing Sheets

(56) References Cited

U.S. PATENT DOCUMENTS

| | | | |
|---|---|---|---|
| 2015/0019317 A1* | 1/2015 | Mitchell | G06Q 30/0226 705/14.27 |
| 2015/0041530 A1* | 2/2015 | Burkhart | G06K 7/1404 235/494 |
| 2015/0248498 A1* | 9/2015 | Han | G06Q 30/0271 235/375 |
| 2016/0371512 A1* | 12/2016 | Hattrup | G06K 15/024 |
| 2018/0181378 A1* | 6/2018 | Bakman | G06F 8/38 |
| 2019/0244164 A1* | 8/2019 | Emert | G06Q 10/0633 |
| 2020/0184291 A1* | 6/2020 | Tisdel | G06K 19/07758 |
| 2022/0147970 A1* | 5/2022 | Babcock | G06Q 20/4016 |

\* cited by examiner

FIG. 4

Companies

Show 25 entries     Search: [ ]

| Company Name | User Name | Holes | Created Date | Updated Date | Actions |
|---|---|---|---|---|---|
| Inventors Help | John Gugiotta | pestest | 2020-11-20 12:35:22 | 2020-11-20 12:35:22 | |

Showing 1 to 1 of 1 entries     First Previous 1 Next Last

John Gugiotta (Administrator)   Log Out

FIG. 5

Scans (Requested Redirects)     Search: [ ] — 510

| Company | Name | Project ID | QR CODE | Request Date | Customer Browser | Customer ID | Server IP | Unique ID |
|---|---|---|---|---|---|---|---|---|
| Inventors Help | John Gugiotta | 4927 | johngui000007 | 2020-12-01 05:35:25 | Firefox/Windows | 24.155.151.105 | 192.124.72.155 | 5f0825c347048 |
| Inventors Help | John Gugiotta | 4925 | johngui000002 | 2020-11-20 12:22:21 | Firefox/Windows | 75.172.55.71 | 192.139.72.155 | 5f0825c347049 |
| Inventors Help | John Gugiotta | 4925 | johngui000001 | 2020-11-20 12:23:13 | Firefox/Windows | 75.172.35.71 | 192.135.72.155 | 5f0825c347046 |
| Inventors Help | John Gugiotta | 4925 | johngui000001 | 2020-11-20 12:23:54 | Firefox/Windows | 75.172.60.71 | 192.139.72.155 | 5f0825c347036 |
| Inventors Help | John Gugiotta | 4925 | johngui000001 | 2020-11-20 12:22:45 | Firefox/Windows | 75.172.89.71 | 192.136.72.155 | 5f0825c347034 |
| Inventors Help | John Gugiotta | 4919 | SCT0452255337 | 2020-11-20 12:13:19 | Firefox/Windows | 24.155.151.105 | 192.105.73.20 | 5f0825c347035 |

Showing 1 to 25 of 6 entries     First Previous 1 Next Last

512 — Project ID    504 — QR CODE    500    506 — Customer ID    508 — Server IP    502 — Unique ID

QR MANAGER

CLIENT 1
COMPANY 1 ADD PAGE
(THE NAME OF THE MENUE WHERE YOU ARE)

PETER PAN
MY ACCOUNT    LOG OUT

SEARCH ENTER SITE: Type something

HOME
CLIENT
TEMPLATES
REPORTS

BACK

SEARCH ON THIS PAGE: Type something

| # | NAME | USER NAME | NOTES | CREATED BY | CREATE DATE | UPDATED BY | UPDATED DATE | COMPANY USERS | BASE URL RANGE START | BASE URL RANGE END | CONTACT | ACTIONS |
|---|---|---|---|---|---|---|---|---|---|---|---|---|
| 1 | Client 1 | User Client 1 | Something | | 02/02/2020 | | 02/02/2020 | | | | | |
| 1.1 | Company 1 | User Comp 1 | Other | | 02/02/2020 | | 02/02/2020 | 0 | 000001 | 010000 | | |

Page Name

Custom End or URL

SECTIONS CAN BE RE-ORDERED BY DRAGGING BLUE BOXES UP OR DOWN. ANY SECTION LEFT COMPLETELY BLANK WILL NOT APPEAR AND THE PAGE WILL "COLLAPSE" TO FILL THE SPACE

Header Block — HEADER BLOCK / TITLE BELOW HEADER BLOCK

Title Below Header Block

Descriptive Text and Picture Block — DESCRIPTIVE TEXT AND PICTURE BLOCK

Video Block — VIDEO BLOCK

Certificate or Other Picture — CERTIFICATE OR OTHER PICTURE

CERTIFICATE
OF COMPLETION
Robert Smith

Form Section — FORM SECTION

SCRATCH FORM
SUBMIT FORM
WARRANTY FORM
OTHER FORM

Choose which type database form to create on the page

FOOTER BLOCK — FOOTER BLOCK

PREVIEW

SAVE DRAFT

SAVE

CANCEL

QR MANAGER

CLIENT 1

COMPANY 1 ADD PAGE
(THE NAME OF THE MENUE WHERE YOU ARE)

PETER PAN
MY ACCOUNT
LOG OUT

HOME
CLIENT
TEMPLATES
REPORTS

BACK

| BASE URL ASSOCIATED TO THIS COMPANY | RANGE | | RANGE USED | RANGES NOT USED |
|---|---|---|---|---|
| | START | END | START-END | START-END |
| http://holdshield.net/sc10455/z | 000001 | 010000 | 000001-005000 | 005001-007000 | 007001-010000 |
| http://holdshield.net/sc10455/a | 000001 | 010000 | 000001-005000 | 005001-007000 | 007001-010000 |
| http://holdshield.net/udv/a | 000001 | 010000 | 000001-005000 | 005001-007000 | 007001-010000 |

MAIN REDIRECTS

PRIMARY PRODUCT INFO
Product Name | SKU # | BATCH #
Sales channel | Person | Custom Field

DATE REDIRECTS

⊕

SUB-PRODUCT RANGE
Name | Range Start - end +
SKU # | BATCH #
Sales channel | Person | Custom Field

PROMOTION

⊗

SUB-PRODUCT 1 RANGE
Name | Range Start - end +
SKU # | BATCH #
Sales channel | Person | Custom Field

DATA BASE FIELDS

SAVE DRAFT
SAVE
CANCEL

FIG. 19

BEFORE SCRATCH
AFTER SCRATCH
FIG. 21

ADAPTIVE DIGITAL AUTHENTICATION AND MARKETING DATA TRACKING

COPYRIGHT NOTICE

Pursuant to 37 C.F.R. 1.71(d)-(e)(1988), a portion of the disclosure of this patent document contains material which is subject to copyright protection. The copyright owner has no objection to the facsimile reproduction by any one of the patent documents or the patent disclosure, as it appears in the Patent and Trademark Office patent file or records, but otherwise reserves all copyright rights whatsoever.

BACKGROUND OF THE INVENTION

1. Field of the Invention

The present invention relates generally to a system and method for brand protection and counterfeit abatement and, more particularly, to a system of and method digital authentication adaptable for diverse programmable use.

2. Description of the Related Art

Brand protection is generally the process for preventing third parties from using intellectual property without permission. Trademark or copyright infringement more specifically, and preventions of counterfeiting of physical goods generally are the predominant forms of intellectual property infringement that owners want and need to protect from infringement in order to reduce loss of revenue or loss of brand equity.

Brand authentication is a related practice that may function as brand protection, but also may be utilized in order to provide tracking and tracing of products throughout distribution. By way of example, and not meant as a limitation, many states regulate the content and delivery of various products such that distribution must be tracked or content certification being provided to a consumer prior, at, or after its sale. Various types of technology are currently available for "track and trace" functions, many of which used security markers to provide overt or covert verification and may include forensic security features as well. Overt security elements facilitate visual verification of product authenticity. Covert security features (i.e., those not visible to the human eye) also require an enforcement device to view the covert feature(s). Forensic security components require in-depth analysis in a laboratory environment and can be used as evidence for litigation. Products to facilitate these various types of authentications may include security hang tags or labels, either metallized or clear holographic (either film or paper based), heat-seal transfers, sew-on labels, woven labels, encapsulated labels, or anti-tamper packaging or package seals.

In addition to brand authentication for the customer, the product provider may also utilize such tracking or tracing information for marketing, promotion or other similar activities. Many types of marketing communications are used to inform or persuade target audiences of the relative merits of a product, service, brand or issue. Whether to increase awareness, create interest, generate sales, or create brand loyalty, the collection of the same or similar data can increase a company's ability to identify its customers.

The International Organization for Standards ("ISO") provides guidelines and performance criteria that reiterate the above to help brand owners define the particular authentication elements for either the packaging or material good itself, based on a counterfeiting risk analysis. Further according to ISO Standard 12931, a smart phone is a technical equivalent to an off-the-shelf covert authentication tool for providing for authentication verification. According to the ISO standard 12931, track and trace solutions alone, e.g., a serialized 2-dimensional barcode placed on each product, is not authentication. Similarly, Quick-Response ("QR") Codes have no inherent protection against exact copies, unless additional techniques are used such as digital watermarks or secure graphics added into QR Codes to make them robust against copy. These, in conjunction with a portable device enabled application, can be used to authenticate.

While not inherently intended for brand authentication, QR Codes are widely used for promotions, consumer engagement and distribution channels monitoring. A barcode or QR code (i.e., a matrix or two-dimensional barcode) may contain information about the item to which it is attached. In practice, QR codes often contain data for a locator, identifier, or tracker that points to a website or application. Common in consumer advertising, a smart phone is used as a QR code scanner, displaying the code and converting it to some useful form, typically a standard URL for a website, thereby eliminating any need for a user to type it into a web browser. QR codes are also used over a much wider range of applications, including commercial tracking, entertainment and transport ticketing, product and loyalty marketing and in-store product labeling.

While well established and successful in consumer advertising application, improvements in their use in authentication, promotion and marketing for brand authentication or "track and trace" would be beneficial, allowing combined functions as well as allowing for unforeseen synergies. Consequently, any means for allowing QR Codes to be adapted for digital authentication functions would be a welcome improvement in the field.

SUMMARY OF THE INVENTION

Objects of the present invention include providing a system for and method of adapting QR codes for use in authentication, promotion and marketing, including brand authentication or "track and trace" functions.

It is a feature of the present invention to provide for the redirecting of QR Code destinations based on user-definable criteria (or user set triggers), thereby allowing code function to change as desired or over time based upon a date sensitive trigger.

It is a further feature of the present invention to allow for such redirection of groups of multiple QR Codes.

Briefly described according to the present invention, a QR management system is provided for redirecting QR Codes based on user-definable criteria and user set triggers or change events. Using a security indicium on a printed or adhered label or tag (or other functional equivalent such as, for example, a near field communication device) on the product or its packaging, consumer brand connection and marketing may be accomplished through otherwise conventional use of the QR code directing to a standard URL or generated personalized URL to a website. The QR code may be assigned individually or may be allocated to a product range with each code or each code within a range being directed to a different location. In addition to the brand owner's product web page, a web page creation system may allow for the brand owner to populate and customize landing content to which the QR code directs. The QR management system tracks all scans and provides reporting of data such as product, location, date and time of code use. The landing content may further allow for real time, on demand changes to such consumer's accessible content. Further still, QR scans may be diverted to secondary landing content based upon an owner defined criteria, which may include number of scans or dates of a scans, time and date or date ranges of each scan.

Primary uses for the QR management system are for combing marketing and authentication. Distributed channels can be monitored, and illicit activity detected from analysis of the data generated from code scans.

Additionally, consumers' incentives may be provided for subsequent scans, not necessarily for the primary purpose of verifying authenticity, but to obtain relevant information about the product or to engage in a loyalty program.

Further, by allowing for the easy redirection of batches of codes assigned by a user and allowing sets of codes to be used for certain projects, products, campaigns, redirection and other functions can be implemented either in advance of or after the QR application with no advance planning necessary. By select and redirecting individual codes within a batch, they may be used for authentication, or used for date dependent functions such as promotions, warranties, product expiration, loyalty programs and more. Such functionality provides a user with the ability to setup campaigns or promotions using a customer specific package without a separate mailing. Use of a management interface allows even low-level personnel with little web experience to create product pages and/or date dependent function such as promotions etc.

Additional uses for the QR management system may allow for integration with features for customer relationship management ("CRM"), enterprise resource planning ("ERP"), track & trace, warehouse or supply chain management. The system may allow for the creation of sign-up forms to collect contact information for mailing lists, CRM, etc., and tied directly to the specific product that was scanned. Advanced authentication may further be provided, such as through individual scratch number validation. Search functionality within QR manager system allows end users to find certain products by their QR code, batch number, stock-keeping-unit ('SKU') or a combination etc. without scanning. Further still, the information may integrate into other ERP, T&T, WMS, & CRM solutions, either through API or direct scan use by integrating QR data set as serial number into other proprietary systems.

An advantage of the present invention is that it may be scalable.

Another advantage of the present invention is that it may be used with virtually any product to connect brands to actual users through their own packaging, regardless of sales or distribution channels.

Yet another advantage, the present invention allows marketing and promotions to be run based on the same QR code bearing product package, thereby allowing repeated or redesigned uses over time.

Further, the present invention may be accessed without preprinting batches of pre-defined codes and using virtually any smart phone or mobile device without the need for custom software applications.

Further, the present invention may further be used in connection with a push or pull database in order to facilitate warranties, V-Cards (or other contact management), memberships, promotions or other uses.

Further objects, features, elements and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 4 is a schematic of an exemplary user company configuration screen for use therewith;

FIG. 5 is a schematic of an exemplary users can log screen for use therewith;

FIG. 10 is a schematic of an exemplary webpage creation template for use in conjunction with the present invention;

FIG. 11 is a schematic of an exemplary push/pull database for use in conjunction with the present invention;

Figure 12:
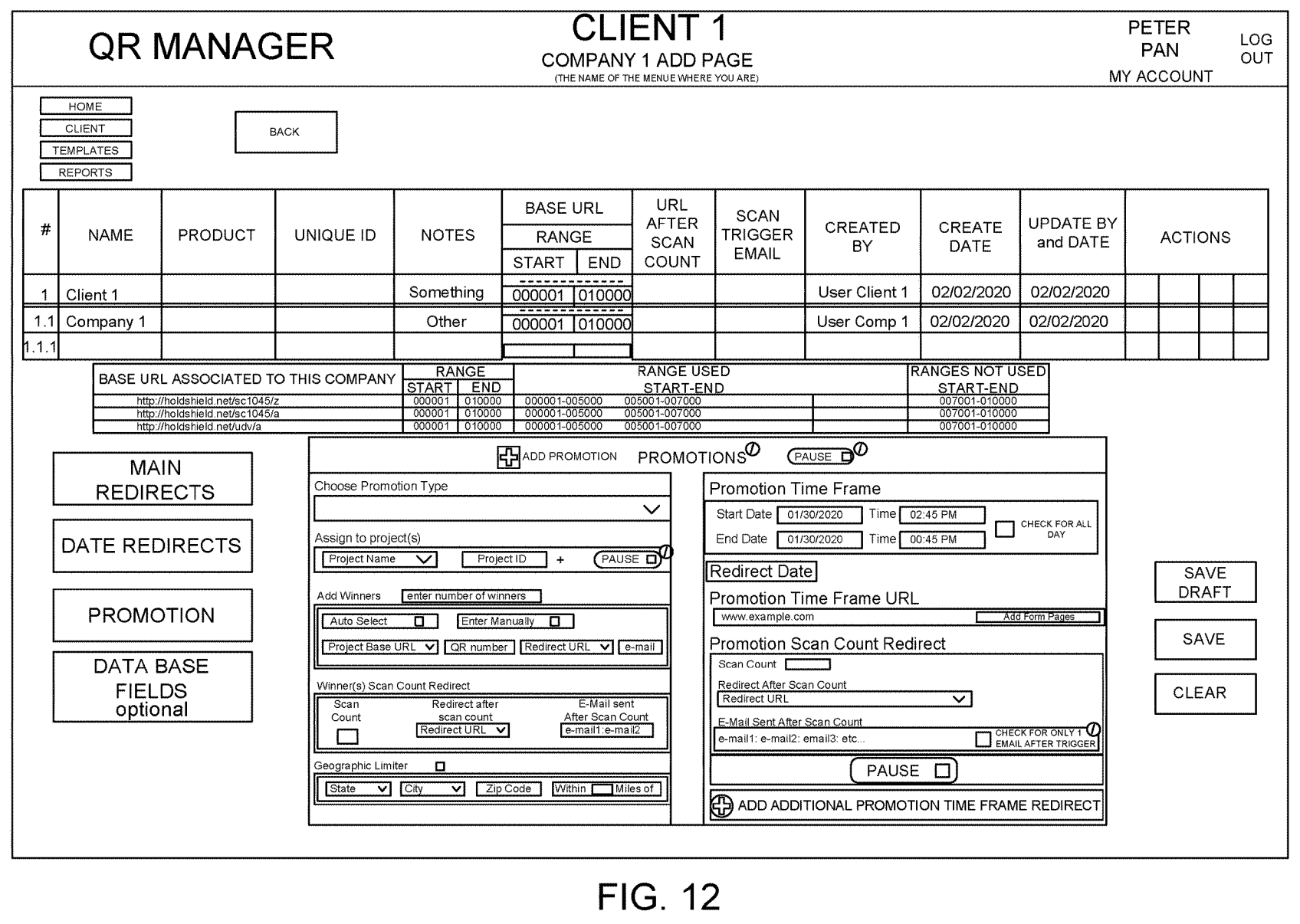

FIG. 12 is a schematic of an exemplary promotions creation template for use in conjunction with the present invention;

Figure 13:
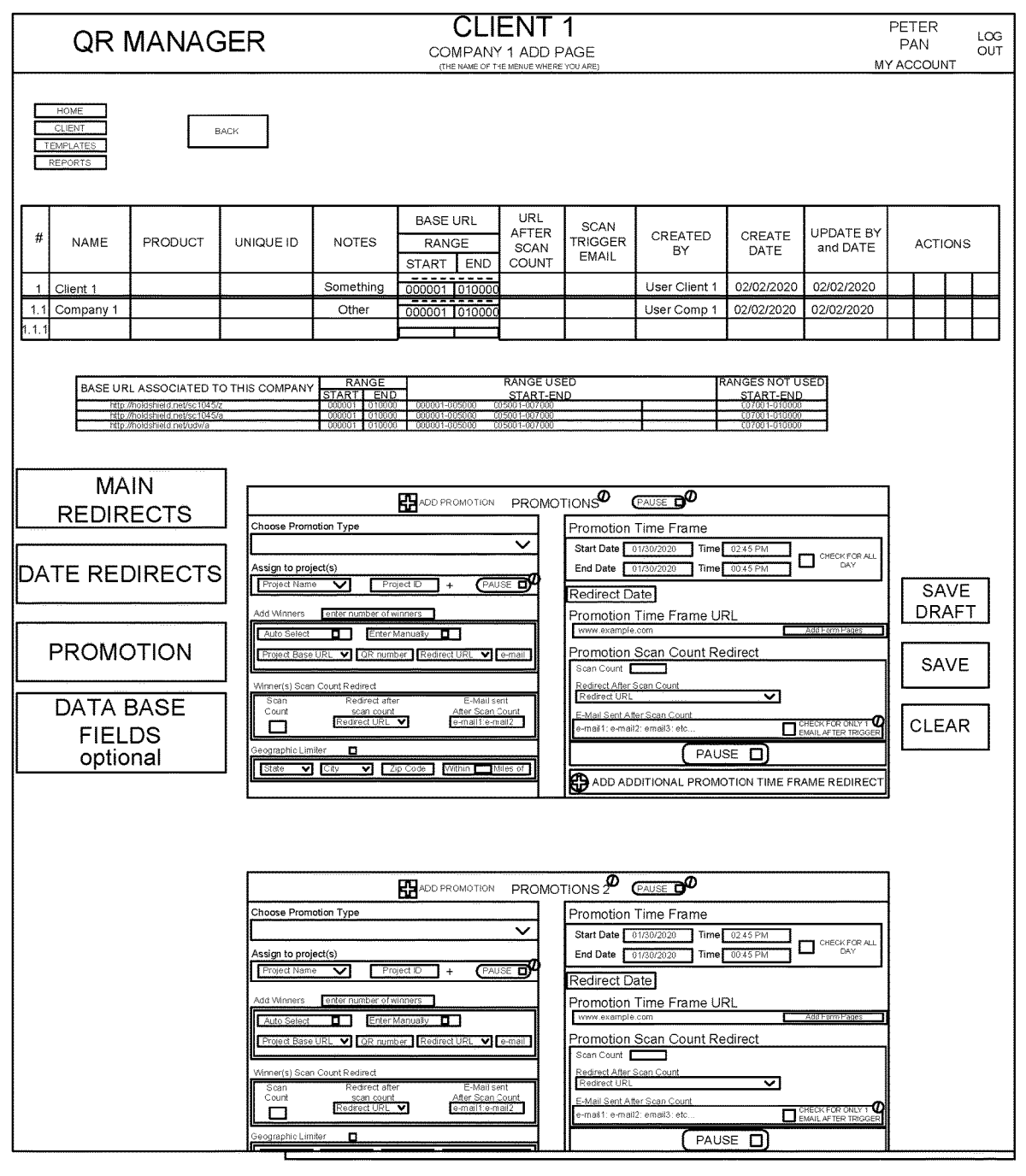

FIG. 13 is a schematic of an exemplary continuation of the promotions creation template for use in conjunction with the present invention;

FIG. 15 is a schematic of an exemplary continuation of the date trigger redirect template for use in conjunction with the present invention;

Figure 16:
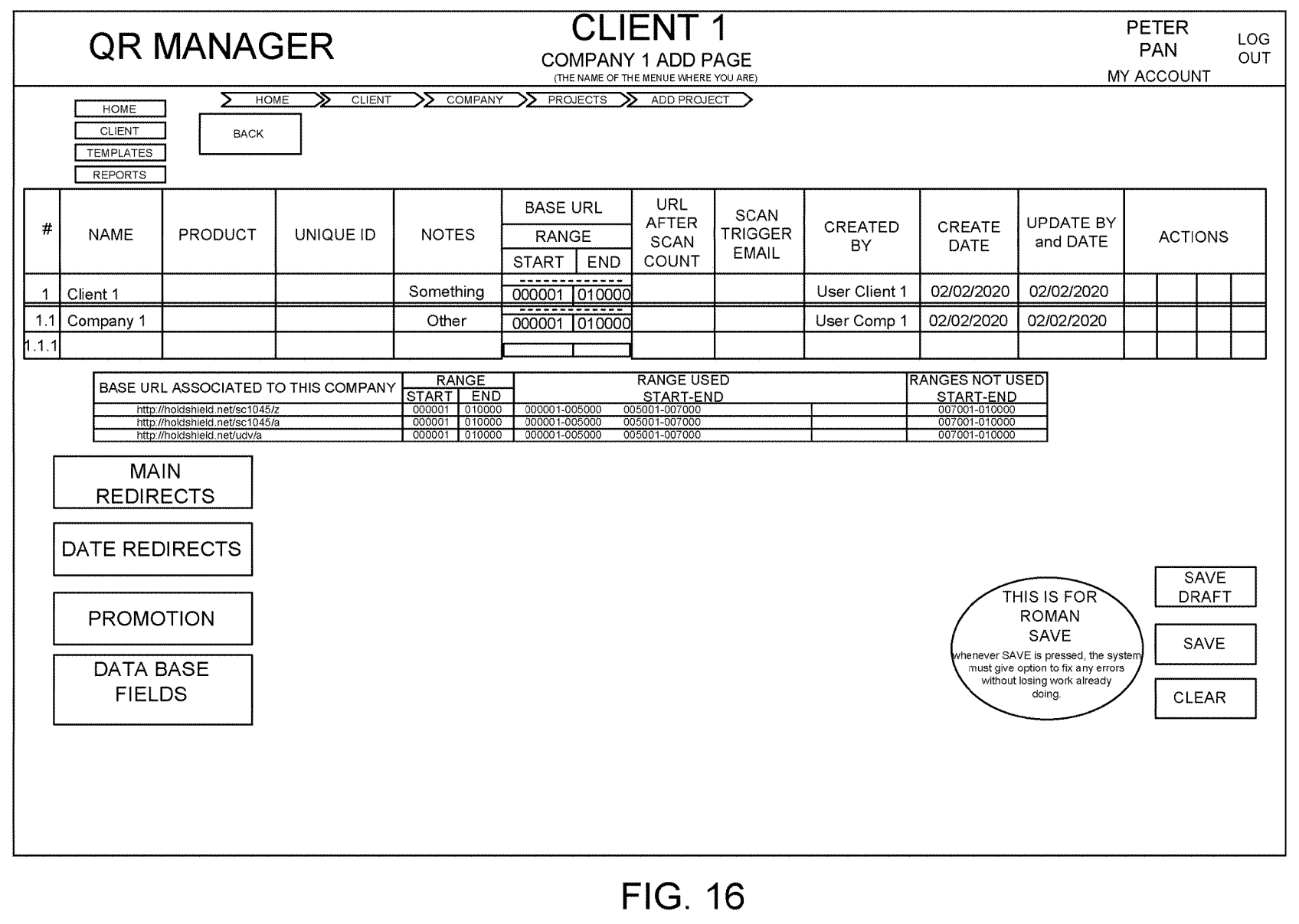

FIG. 16 is a schematic of a new project template for use in conjunction with the present invention;

FIG. 17 is an exemplary schematic for a promotional redirect information screen for use therewith;

Figure 18:
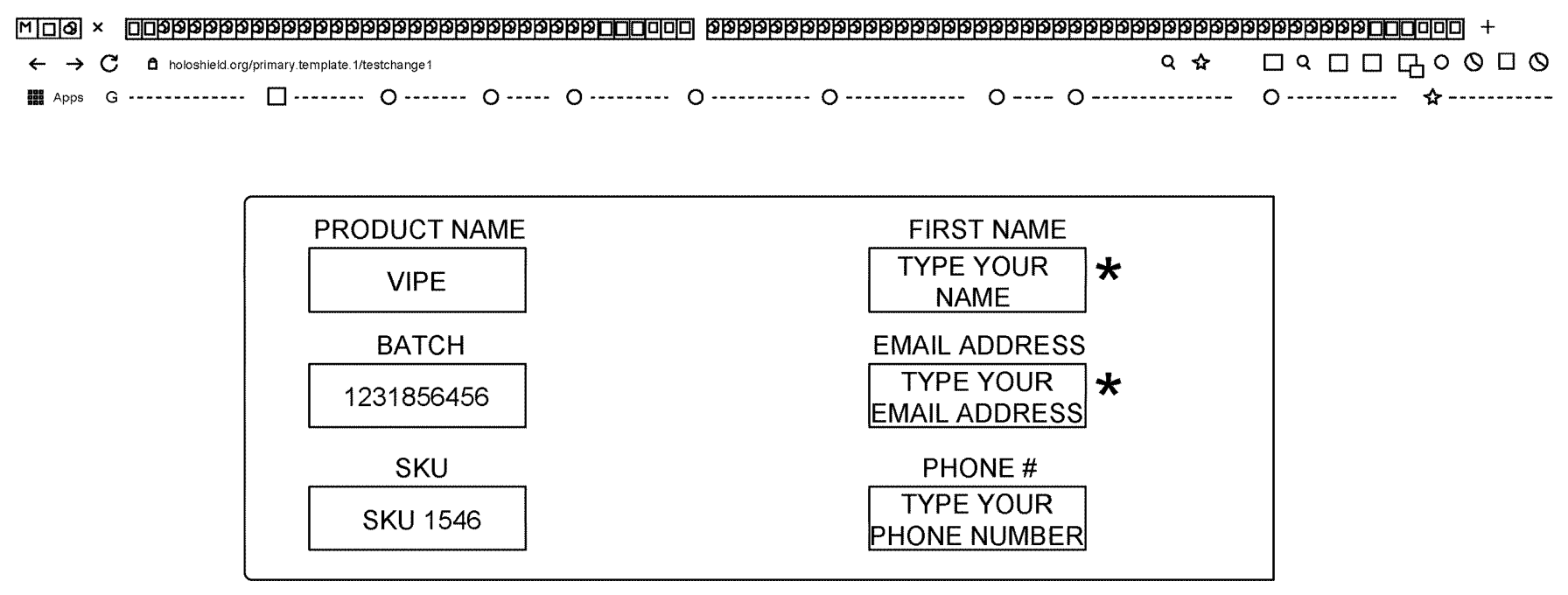

FIG. 18 is a schematic for a web page creation system for the promotional redirect example of FIG. 17;

FIG. 19 is a schematic for a company user entered (push) database entry screen for use therewith;

FIG. 21 is a schematic of a scratch-off QR Code promotional, shown before and after. for use with the present invention.

DESCRIPTION OF THE PREFERRED EMBODIMENTS

Figure 1:
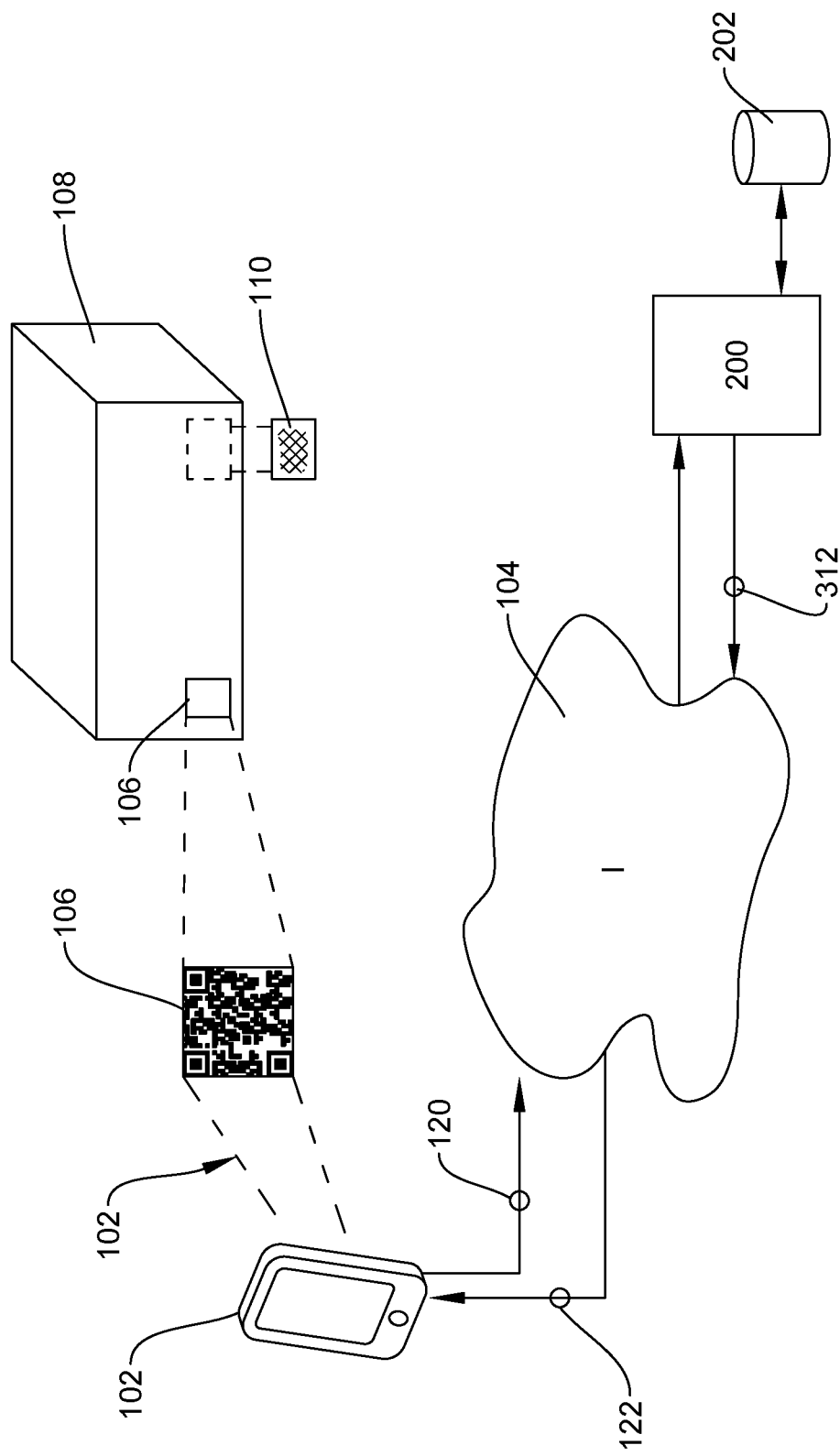
FIG. 1 shows a schematic of a system for programmable digital authentication in accordance with a preferred embodiment of the present invention.
Figure 2:
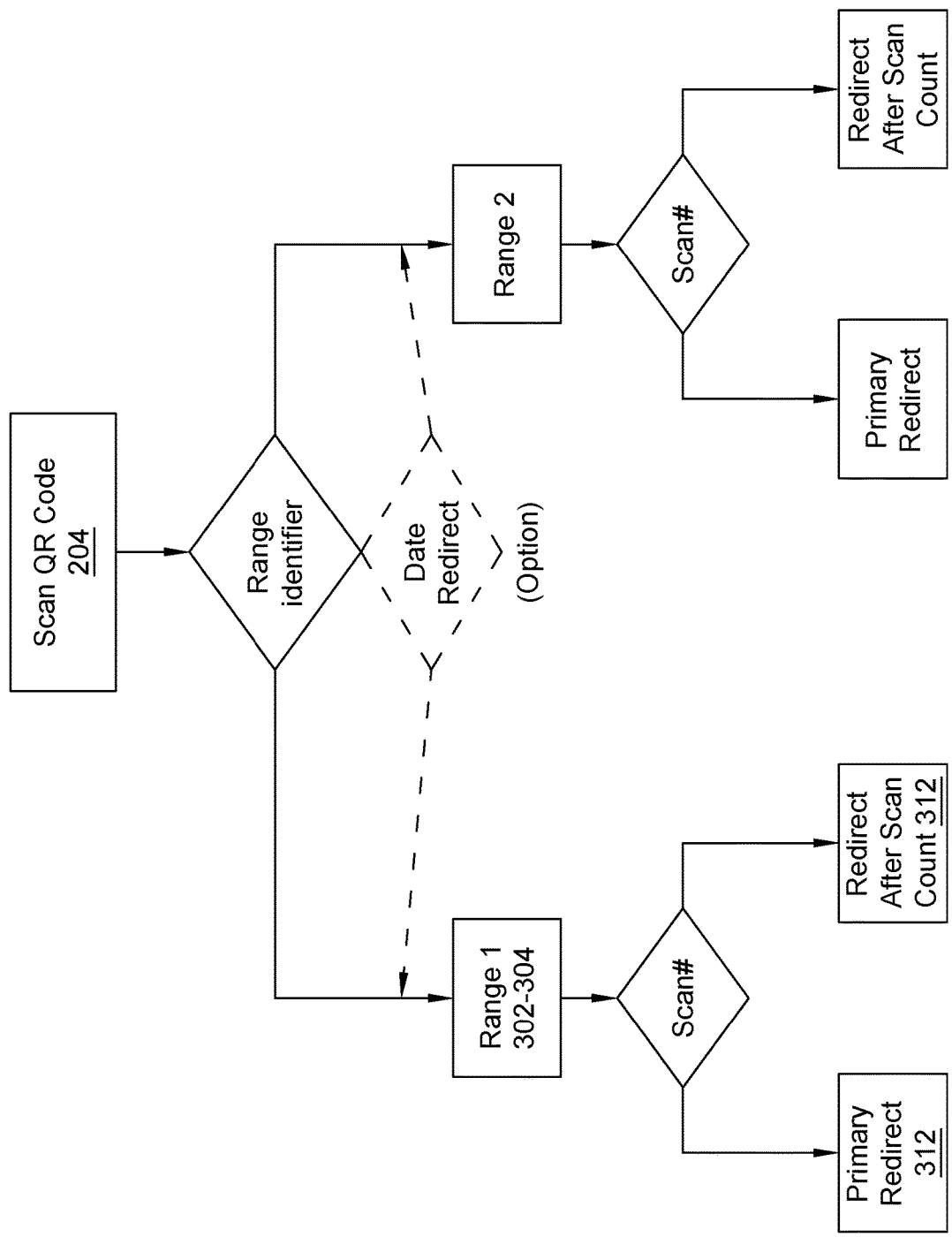
FIG. 2 is a flow diagram of a method for programmable and adaptive digital authentication in accordance with the preferred embodiment of the present invention.

For purposes of the present disclosure, an ERP system may be a comprehensive software platform or noncomprehensive system component designed to manage and integrate all aspects of an organization's operations, including finance, supply chain, operations, reporting, manufacturing, and human resource activities. Within the context of a QR code management system, an ERP system may extend to include direct integration with QR code-driven data collection and processing functionalities. This integration enables the ERP system to utilize QR codes as a mechanism for triggering specific actions or workflows, such as updating inventory levels, tracking product movements, or initiating procurement processes, based on data collected from QR code scans. An ERP system should be construed broadly to serve not only as a central repository for organizational data but also as an active participant in data acquisition and action initiation, facilitated by the QR code management system.

For purposes of the present disclosure, a Customer Relationship Management (CRM) System may be any system designed to manage a company's interactions with current and potential customers or prospects, using data analysis about the contacts' history with a company to improve business relationships, specifically focusing on customer acquisition and retention and ultimately driving sales growth. When integrated with a QR code management system, the CRM may include capabilities expanded to include direct interaction through QR code scans, enabling personalized customer engagement based on specific interactions, such as scanning a QR code on a product or advertisement. For purposes of the present invention this integration allows for the collection of contact information, preferences, and interaction history, directly tying specific scans to individual customer profiles. Such a system may automatically update customer records with new interactions, preferences, or feedback gathered through QR code-initiated processes, making the CRM system a dynamic tool for enhancing customer engagement and personalization.

For purposes of the present invention, a Track and Trace, Warehouse, or Supply Chain Management system may be any system designed to oversee and optimize any logistic operations, from the tracking of goods as they move through the supply chain to the management of inventory and warehouse operations. The integration of these systems with a QR code management system allows for the seamless tracking and authentication of products at any point in the supply chain or within warehouse operations through QR codes. This includes enabling detailed tracking of product movements, verification of authenticity, management of stock levels, and efficient retrieval and dispatching of goods. The QR code management system enhances these capabilities by providing a direct link between physical products and their digital counterparts in the management systems, facilitating real-time updates and visibility.

For purposes of the present disclosure, a QR code management system should be broadly construed as being capable of integrating with these ERP, CRM, track and trace, warehouse, and supply chain management systems either through APIs or direct utilization of QR data. Further still, a QR code management system may function as an integrated app itself, offering functionalities such as sign-up forms for direct customer engagement, advanced authentication mechanisms like scratch number validation, and search functionalities allowing end-users to locate products by QR code, batch number, SKU, or combinations thereof using standard mobile camera, QR code scanning apps, and/or a specific app developed for QR code management. This integration ensures that the QR code management system can act as a bridge, enhancing the capabilities of traditional ERP, CRM, and supply chain systems by providing a direct, interactive link to the end-user or operational processes, thereby expanding the utility and applicability of these systems beyond their conventional scopes.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, which is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

1. DETAILED DESCRIPTION OF THE FIGURES

By way of comparison with the otherwise conventional art, existing "QR" stands for "quick response", or sometimes referred to as "quick read", and is a version of a two-dimensional 2D bar code that can provide a high rate of data correction and fast scans by mobile devices. Original 'static' QR codes comprise over 90% of codes in the US marketplace today and have paved the way for consumer acceptance and use of QR codes. The QR code itself is simply a data set which allows a reader or scanner to make them useful. Virtually all mobile devices (Android and IOS) manufactured since 2017 (and many previous) have QR Code "scanners" built into their native system cameras (and for IOS a native QR reader app as well). Any time a QR Code is "seen", the apps simply open the native browser of the device and inserts the data from the QR code. If the data is a URL, the browser is directed to the corresponding web page.

In practice, whatever the data contained in the QR can be used in numerous ways depending on the reader (or application) functionality. A tradition 'dynamic' QR code, as used in the existing art, simply creates a "shortened" URL. Depending on the application used to generate the dynamic code, such shortened URL's can allow a user to change the 'landing page' of where a particular code is directed without changing the code itself. This is a big step forward for QR codes, since a change of landing page does not require a user to change the actual page of the original URL in the code. For instance, if a QR is directed to the home page of a business, and later the company wants to direct that URL to a specific product page, a static code would not allow such a functionality. However, this capability exists with a dynamic code. It is estimated that these conventional dynamic codes may account for 90% of the non-Static codes in use today.

However, there are drawbacks of these existing dynamic codes. First, if the service companies creating these codes cease operation, the codes created will stop functioning. This is especially an issue if it is being generated by some free application and the company has no motive to continue offering the service. Even Google® has previously abandoned a link shortened program after some years of offering. Second, such dynamic codes can be used only for a single item, and as such will operate like a UPC code. In such system if a brand creates 10,000 items, they will in general use 10,000 of the same code. For the most part, such standard dynamic QR's cannot be customized or white labeled and, at best, may be able to provide only a part of the URL not the entire URL.

In contrast to traditional dynamic codes, the present invention allows a user to create and manage batches or sets of codes, where a unique QR Code may be applied to each individual item. Such a single QR may therefore have many technologically and logistically integrated uses.

Referring now to the drawings, wherein like reference numerals indicate the same parts throughout the several views, adaptive digital authentication is provided using a QR code management system in combination with, and for redirecting QR codes based on user-definable criteria and user set triggers or change events. As shown generally in conjunction with FIG. 1, a system for programmable digital authentication, generally noted as 100, is shown in accordance with a preferred embodiment of the present invention. A computing device, and preferably a portable computing device 102, is used to communicate via a network 104, with a QR code management system 200 (as described in greater detail below). The portable computing device 102 is provided capable of scanning a QR Code 106 and includes a device such as smart phones (as shown) as well as tablets and desktop units (not shown) or other functional equivalents. Such reporting may thereby provide track and trace functionality. Additional data may be further acquired to record the origin of each trace by geographic location or more specifically by retail location. This information can be presented in report form to determine patterns or locations that may be indicative of the use of non-authentic counterfeit codes. As shown best in conjunction with FIGS. 11, 17, 18 and 19, the QR code management system 200 may include a server enabled database 202 capable of storing QR code configuration tied to information entered in or collected from processing information or a push/pull database.

The QR code 106 should be broadly construed to include any similar or functionally equivalent security indicium. According to one aspect of the present invention the security indicium, including QR code 106, may be provided as a printed indicium on product packaging 108, or otherwise adhered to the packing via a label or tag 110. It should be understood that the uses of such printed QR codes are provided merely as exemplary of a best mode of the present invention, but it should become apparent to those having ordinary skill in the relevant arts, in light of the present teachings, that other functional equivalent security indicium may be used instead, such as, for example, a near field communication device on the product or its packaging.

Figure 3:
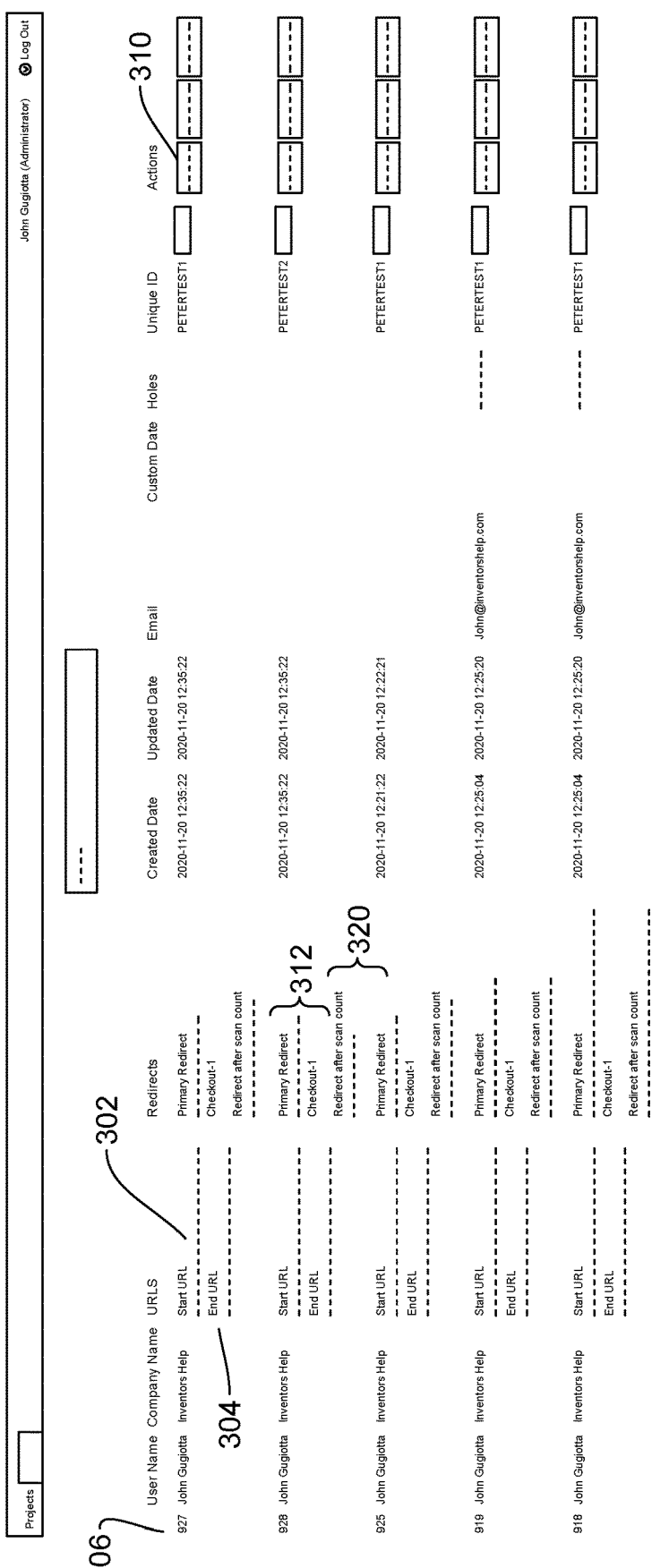
FIG. 3 is a schematic of an exemplary authentication project screen for use therewith.

The QR code (or its equivalent) may be provided as part of a larger grouping or range of codes. Code ranges may span from an initial range indicium 302 to a terminal range indicium 304. According to one aspect of the present invention the QR code may be selected from a group that may be assigned individually. According to a second aspect of the present invention, a series of QR Codes may be allocated to a product range. As best shown in conjunction with FIG. 3 in which an authentication or promotion or marketing project screen 300 is shown, a user may configure one or more individual projects 306 in which various sequences or ranges may be individually configured.

A feature anticipated as being beneficial includes the ability to edit or copy existing projects 306. By way of example, and not meant as a limitation, a user may edit 310 a project 306 and thereby configure an initial range indicium (i.e., range start) 302 to a terminal range indicium (i.e., range end) 304, as well as to provide programmable redirects, including a primary redirect 312. The primary redirect may be adapted to direct a user, upon scanning 204 of the code 106, to a standard URL or generated personalized URL ("PURL") to a first website or location. Within any aspect of the invention each code or each code within a range may be directed to a single location 312. Further, some, each or every of the series of QR codes may be individually directed, each to a different first website or location.

In any aspect of the present invention, the first website or location 312 may be the brand owner's product web page. However, according to an additional aspect of the present invention a web page creation system 600, shown in conjunction with FIGS. 6 and 18, may be further provided to allow the brand owner to populate and customize the landing content to which the QR code directs. The web page creation system 600 is described in greater detail below.

The landing content may further allow for real time, scheduled, or on demand changes to content accessible by consumers through the QR code scan. QR code scans may further be diverted to secondary landing content 320 based upon an owner defined criteria, which may include number of scans or dates of a scan. Such secondary content may further be through redirection based on the location of scan origin as well as redirection based on a unique device identifier ("UDID"), an Internet Protocol address, customer name or other defined criteria, including which had already been entered or collected into the push pull database or combinations thereof 11, 17, 19.

Figure 8:
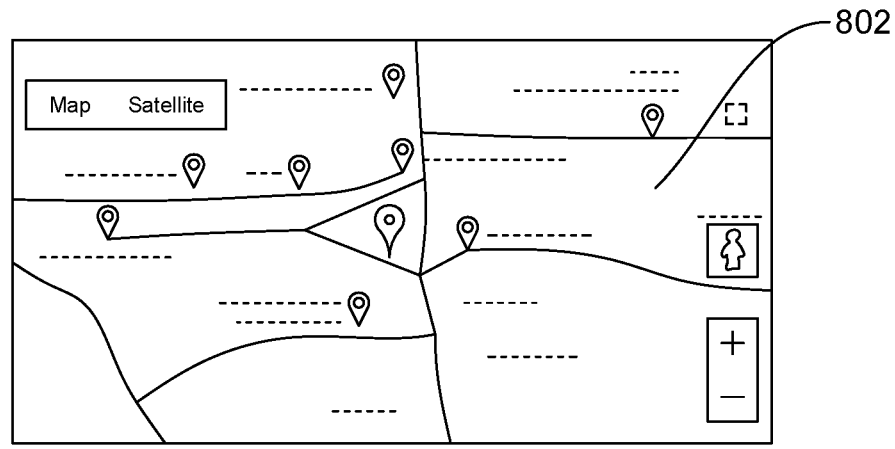
FIG. 8 is a schematic of an exemplary user scan information screen for use therewith.
Figure 9:
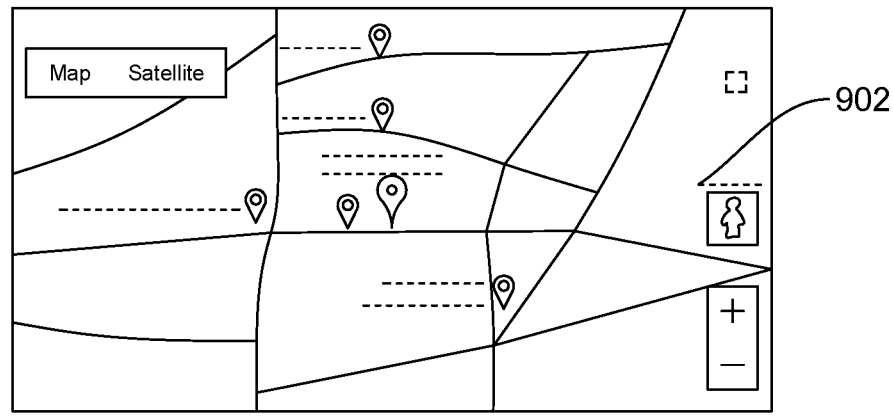
FIG. 9 is a schematic of an exemplary server scan information screen for use therewith.
Figure 11:
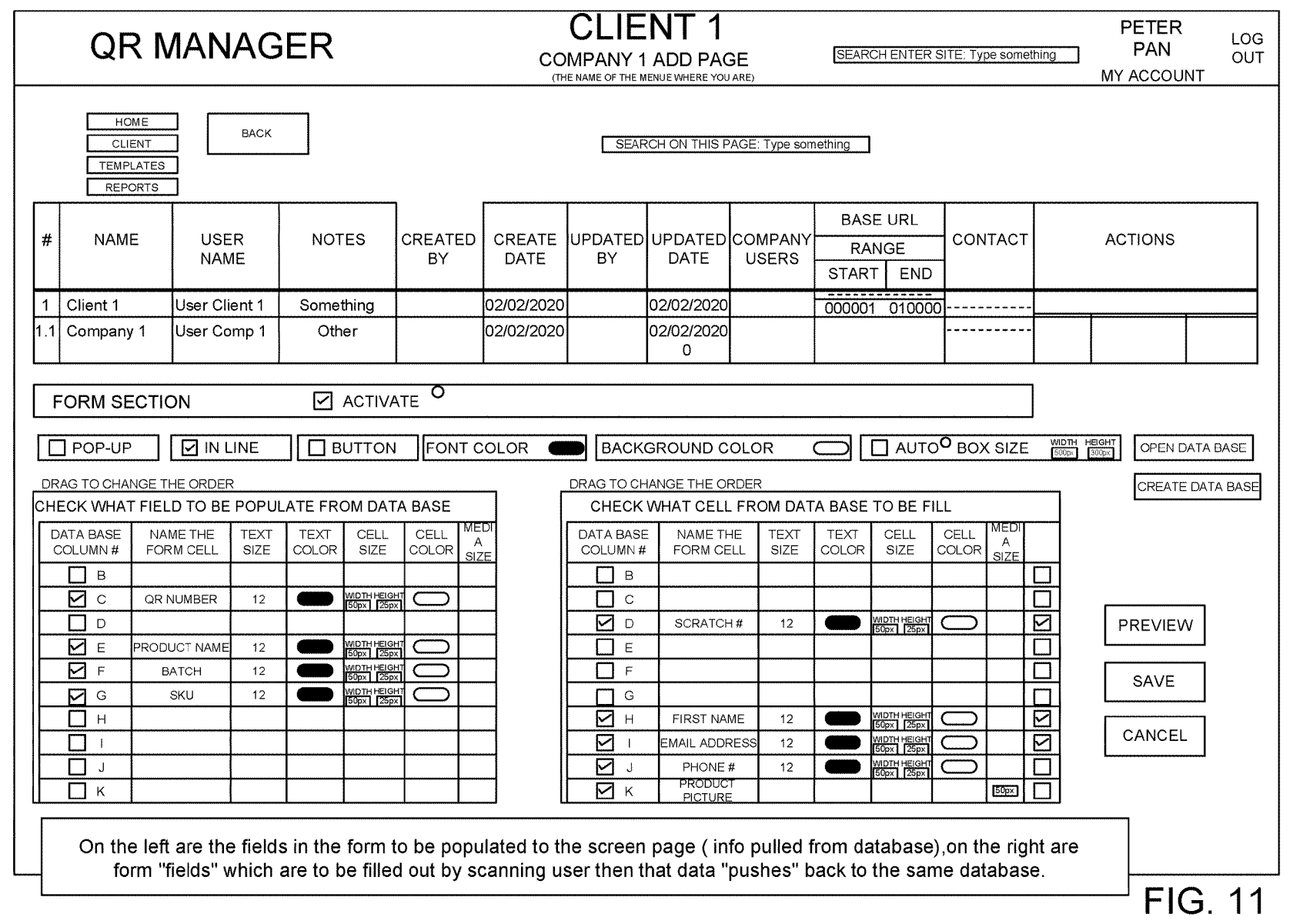
Figure 14:
FIG. 14 is a schematic of an exemplary date trigger redirect template for use in conjunction with the present invention.
Figure 15:
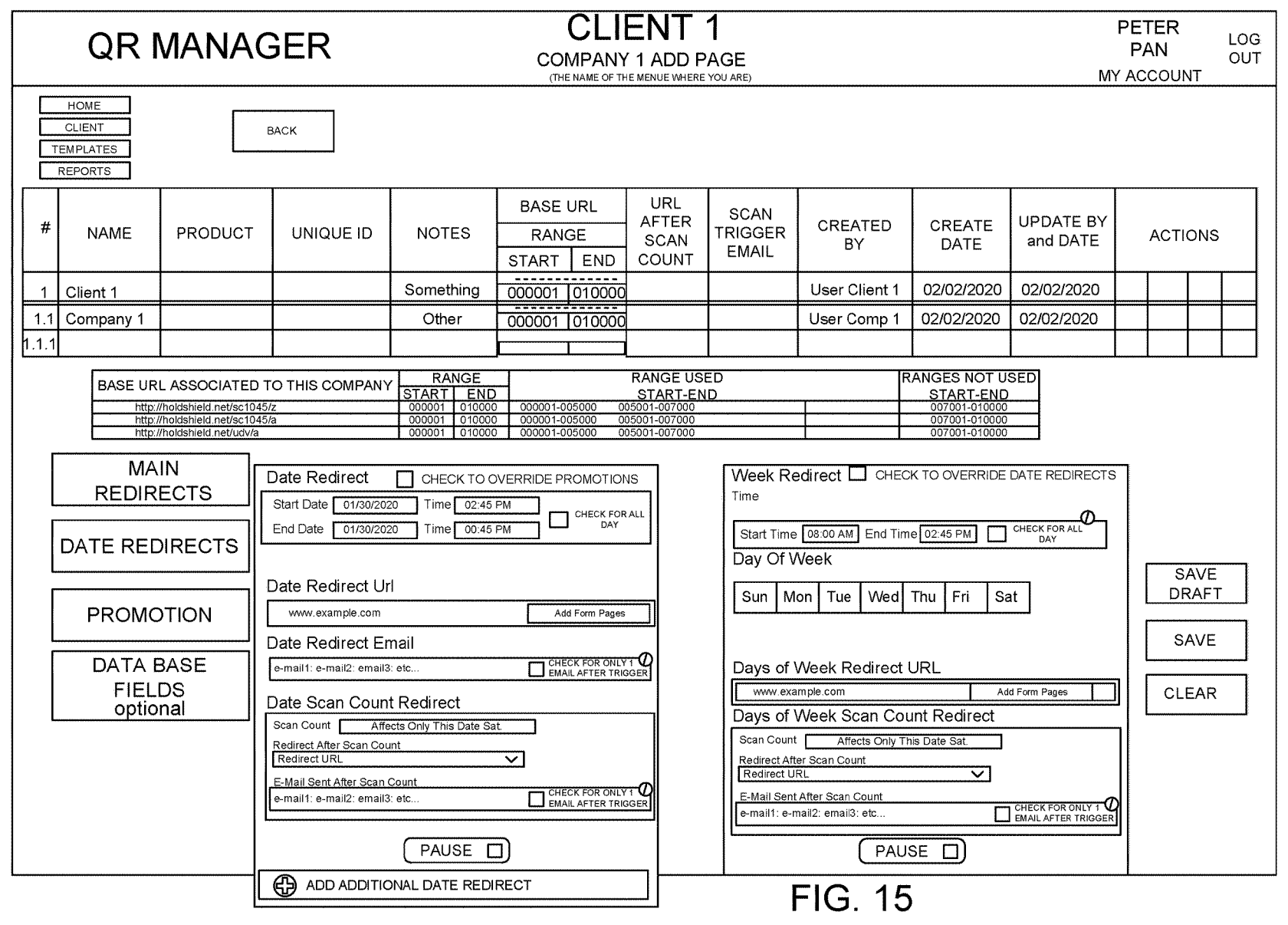
Figure 17:
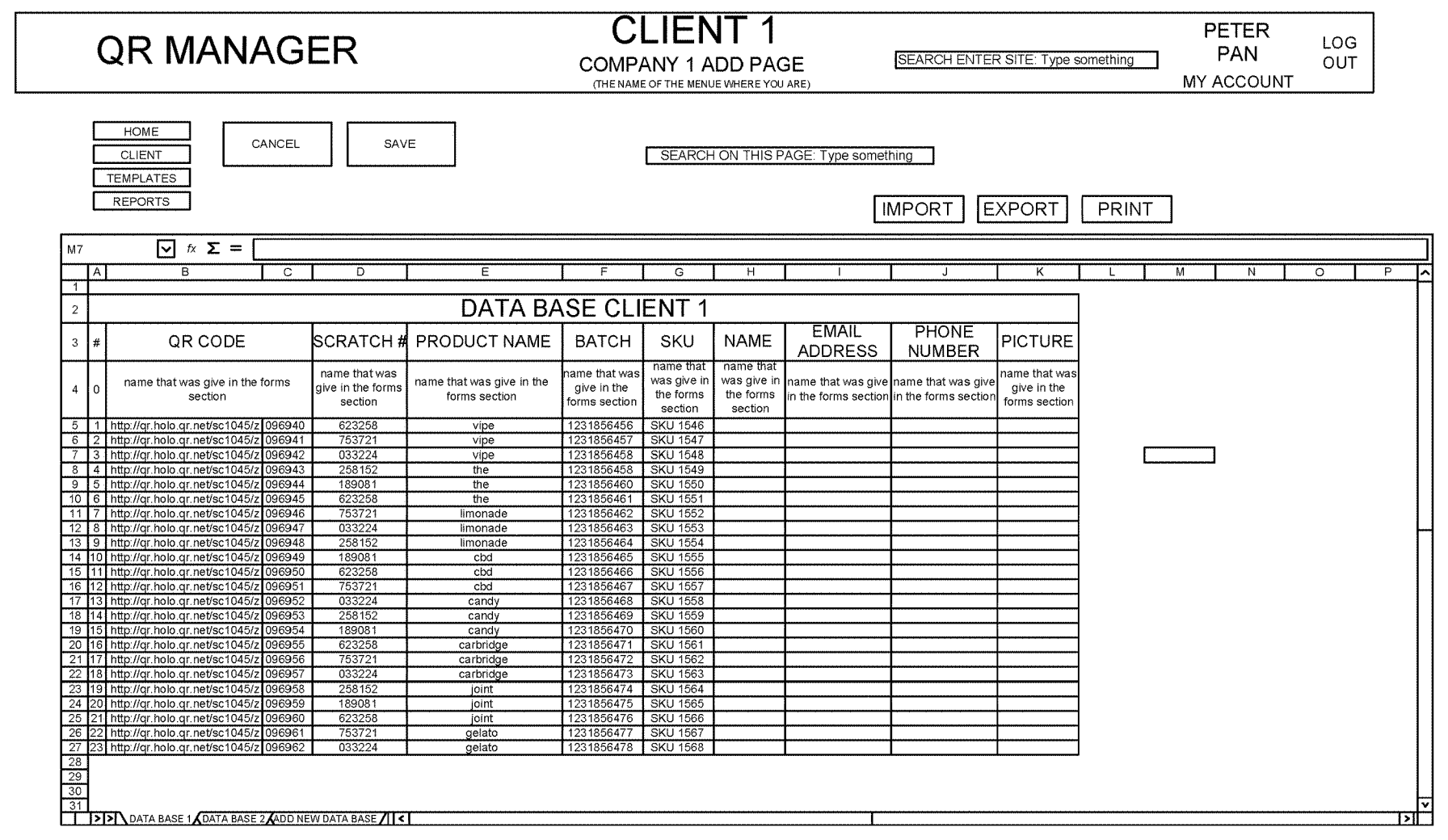
Figure 20:
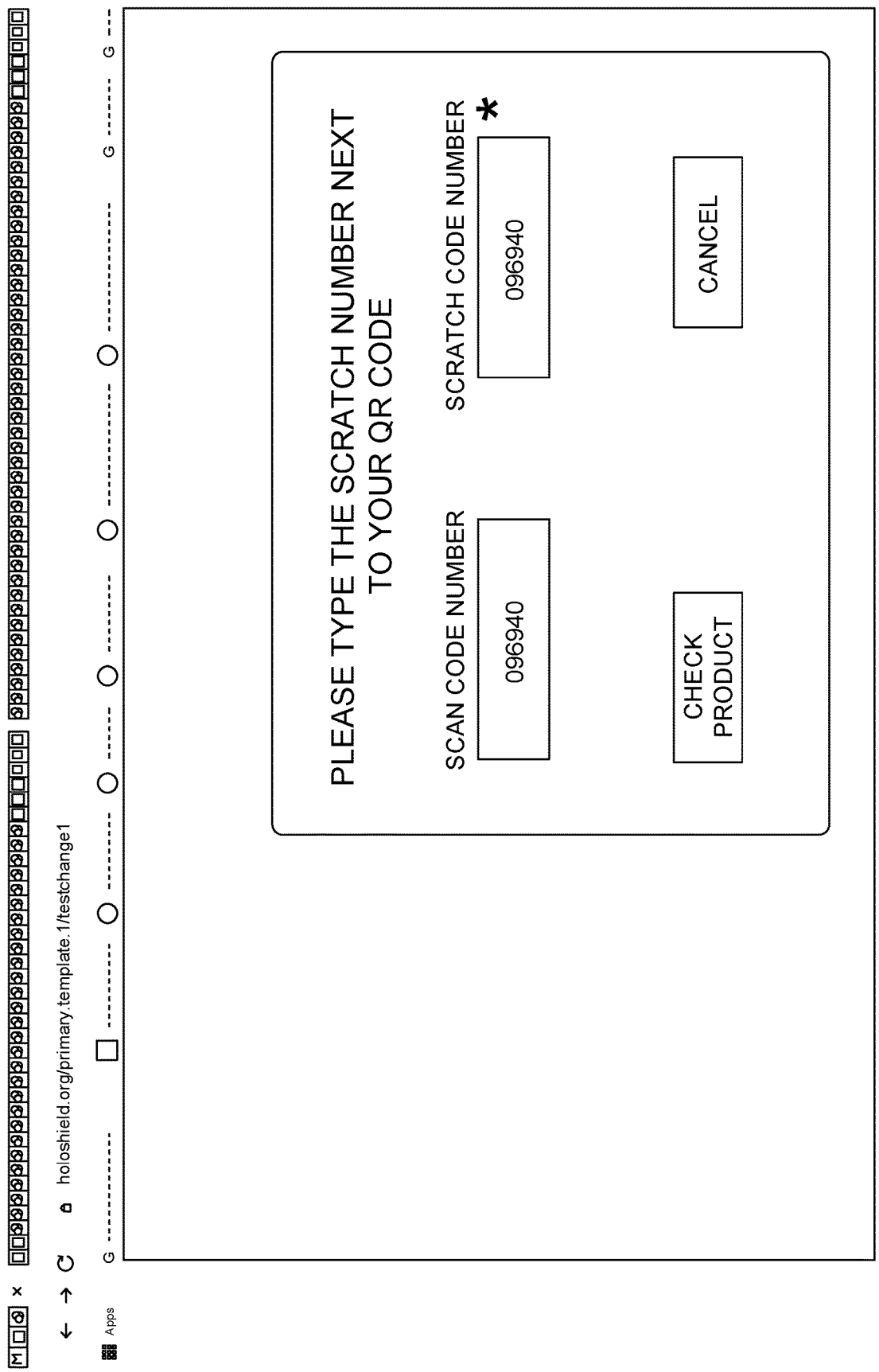
FIG. 20 is a schematic example of a scratch-off promotional database entry screen for use therewith.

The QR code management system 200 may be further provided and adapted to track the scans of all the codes. As shown in conjunction with FIG. 5, a scan log screen 500 may provide reporting of tracked data 502 including a date 504, customer location 506, server location 508 and time of each code use 510. Referring in conjunction with FIG. 8 and FIG. 9, the tracking data 502 may be provided in greater detail and in an alternate format. For example, a user scan information screen 800 may provide additional detail user information that may include database fields found either (or both) in the company user entered (push) database (FIG. 14, FIG. 15, FIG. 17 and FIG. 19) including but not limited to product type, UPC, batch information, color, size etc. as well as other data from a scan user (pull) database such as customer name, phone, address, phone, etc. (See also FIG. 11) As shown by way of example, users can location information, both graphical 802 in the form of a map or geographical 804 in the form of contact information may be provided. Additionally, a server scan information screen 900 may provide additional detail network connection information. As shown by way of example, server scan location information may be provided in both graphical form 902 in the form of a map or geographical 904 in the form of contact information.

Utilizing the cloud-based network 104, the scanning of a QR code 120 in conjunction with a database storage and retrieval may allow for mobile product verification 122 and item tracking 506, 508 throughout the supply chain. The reporting of scans 500 provides up-to-date information through various code scanning devices such as smart phones, tablets and desktop units 102. Such reporting may thereby provide track and trace functionality. Additional data may be further acquired to record the origin of each trace by geographic location or more specifically by retail location. This information can be presented in report form to determine patterns or locations that may be indicative of the use of non-authentic counterfeit codes.

The subject matter described herein provides management of quick response (QR) codes and a dynamic configuration of their real-time functionality. A QR code may be associated with configured uses for authentication or tracking for marketing, promotion, warranty or other programs as best shown in FIGS. 10, 11, 12, 19 and 20). The ability to create or change the function or use of a unique QR code creates an ability of multiple uses, and the ability to change such program configurations and allow the function of a QR code to change based upon need or function. Additionally, when an event is used to triggers the change in QR code function, each unique QR code can have a dynamic functionality, being used for different functions without being changed. Such event triggers may include detection of a configured number of user scans of the displayed QR code, or other internally tracked factors. The use of such programmed triggers allows the QR code value to be correlated with specific times and/or events. The unique value of the QR code associated with a particular time or event may be used to confirm and/or verify both the authenticity of a presented QR code and the QR code's correlation with the retail environment within which it was displayed and may be used to verify that the user/device that presents the QR code is authorized to utilize the QR code.

Because the function of the QR codes as described may be dynamic configured or changed based on events or triggers, the code management system may be used to aid brand users to utilize those data elements obtainable from each QR code in a number of ways or over time. The code management system 200 may regulate or limit a number of items sold against a particular scan value. For example, where a QR code has been configured for only a single redemption, subsequent scanning of the QR code may be identified and a second attempted redemption of the scanned dynamic QR code may be flagged as an improper attempt at product authentication or incentive redemption.

System users may also utilize the information obtained by the code management system 200 to perform several forms of verification. For example, verification of QR codes 106 may be used to determine and evaluate factors, such as customer conversion rates, customer relation improvement rates, or customer retention rates where products are scanned and/or the code being used. Such identification may identify what products are scanned in a particular geographic area, independent of sales channel or other forms of statistical processing as appropriate for a given implementation.

The dynamic link between projects, promotions and pages allows for implementation in other marketing or promotion activities, such as for warranties, membership programs, contests, voting, contact transfer, etc. The system may use a "push/pull" approach such that a database is the link pin between projects (where QR Code batch sequences are assigned to products, dates of packaging and manufacture etc. as well as redirected based on user definable criteria (i.e., change events etc.) and landing pages which can at once collect (pull) and present (push), either at once or separately as best shown in conjunction with FIGS. 17, 18 and 19. By way of example, and not meant as a limitation, such dynamically collected/presented data may include product name, SKU Number, batch number, sales code (e.g., where sold) etc. By collection of this data into the database when the project is created (and updated any time it is edited as needed), the QR Batch may thereby be linked to certain line items of the database. When an end user scans the product, a page appears with a number of choices, one is "would you like to register your product warranty". When yes, the system returns a page that populates for the user the information that the company user has determined is important (i.e., Product Name, Where Sold, UPC, etc.) already filled in all these fields, then left blank the info the Company User wants to collect (i.e., such as name, e-mail, serial number). When saved, the data collected is "pushed" to the same database as the "pulled" information was from, linking the scanned code to the customer to the product and serial number etc. This push/pull system connected to the package (or direct mail piece etc.) opens up a plethora of features, functions and uses.

Figure 6:
FIG. 6 is a schematic of an exemplary template selection and modification screen for use therewith.
Figure 7:
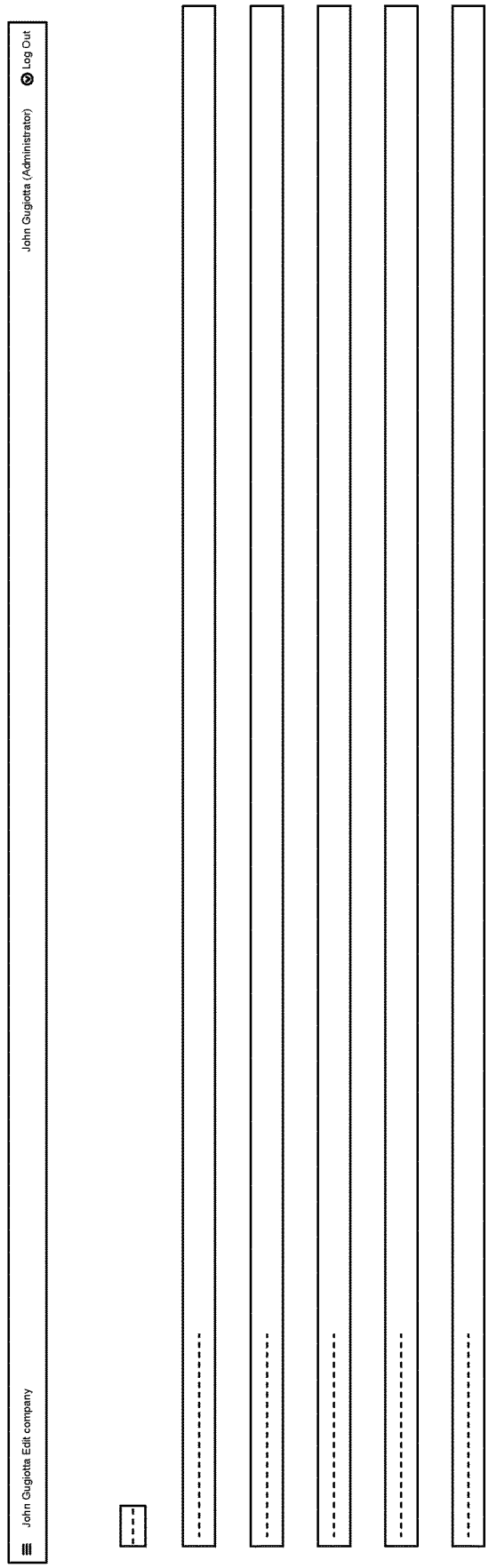
FIG. 7 is a schematic of an exemplary user company modification screen for use therewith.

Finally, the web page creation system 600, shown in conjunction with FIG. 6, may provide templates 602 that may be amended, edited, populated and customized so as to create a particular landing content to which the QR code directs. In conjunction, the QR code management system 200 may allow for the copying of configured projects to allow for an easy starting point for modification of similar authentication, marketing or promotional stratagems.

2. OPERATION OF THE PREFERRED EMBODIMENT

In operation the present invention does not require a specialized scanning or software application for any of its current features, with all available directly from the server software accessed through the QR code via a standard QR scanner or camera application without special programing, downloads or configuration. Such a system provides ease of use and flexibility by providing a system for redirecting QR Codes based on the definable criteria and set 'triggers' or change events. Primary uses for QR Manager are authentication and marketing. By connecting brand owners to their product users through the product's own packaging, authentication and marketing and promotions may be facilitated. Promotions can repeat or be redesigned at any time pre or post QR code creation or distribution. Additional integration may be provided for CRM, ERP, Track & Trace, Warehouse and Supply Chain Management as well.

Such a system as provided allows QR Codes to be adapted for various digital authentication functions. It allows redirection of a single or groups of QR codes based on certain user definable criteria, such as number of scans, date ranges, days or the week, or a combination of a unique QR scanned and user entered data (such as scratch number add figures). Such definable criteria, and their combinations, thus allow for use with a promotion or for authentication by tracking of a first date scanned and/or a subsequent scan count. With such adaptation a unique QR code may act as a serial number or be assigned to each individual item, while still allowing redirects based on groups of numbers (sequential or not depending on version). Further, such projects may be defined with a specific trigger or set of triggers around a single or group of codes but still allowing individual codes to be triggered to act differently than the rest of the group. Such project may further be grouped and programed for redirection within sets based on groups to perform actions for promotions or other duties.

Importantly, because of an ability to configure or reconfigure predefined codes or ranges, either sequential or non-sequential as well as database driven or through an encrypted algorithm, such use of the present invention allows for codes to be pre-printed then assigned later as needed. Such post-printing configuration is very different than other systems that are currently available which require batch printing of pre-defined and pre-configured codes. Further, the acquisition and recording of data from all scans thus allows for reporting on what product was scanned where and when, as well as the IP address associated with the scan (location taken from that IP). This also is very different than conventional use of PURL pages because, again, the QR may be printed in advanced and later tied to projects, pages, validation, sign ups and/or promotions. A personalized database, as shown in conjunction with FIGS. 17 and 18, may then be created from such scans, even though the existence of the database is not necessary when making the QR codes.

Creating further post-printing configurability, target URLs to which programmed QR codes may direct may include pages created from templates within the system and tied to particular projects, including coordination with a push/pull database. The use of such templates may then be edited to facilitate the destination page and further allows unique destinations based on individual or groups of codes based on user definable project(s) and promotions, and that can return customized pages based on information set in the project or linked from the database. As should be apparent to those having ordinary skill in the relevant art, in light of the present teachings, such an integrated system thereby accommodates a fully white labeled product adaptable for stand-alone resale and not required to be presented through a supplier's company or URL, thereby maintaining brand integrity for the user.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples, and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company*, v. *Hilton Davis Chemical*, 520 US 17 (1997) or *Festo Corp.* v. *Shoketsu Kinzoku Kogyo Kabushiki Co.*, 535 U.S. 722 (2002), or other similar caselaw or subsequent precedent should not be made if any future claims are added or amended subsequent to this Patent Application.

I claim:

1. A method of operating a digital interaction system comprising:
    obtaining a system comprising:
    packaging, stickers or tags embedded within one or more scannable codes, wherein
    said scannable codes, when scanned, are configured to direct a user to a predetermined URL or dynamically generated personalized URL leading to a primary first website or location;
    a scannable code management system server having a processor and memory, the memory storing instructions executable by the processor to:
    track scans of said scannable codes and store scanning information in a database;
    generate and provide reports based on the stored scanning information; and
        implement user-defined criteria to generate change event triggers, said triggers causing a modification in the redirection of a user upon scanning of any of the series of scannable codes;
    a network interface on the scannable code management server configured to communicate with the primary website or location and transmit the scanning information and the change event triggers; and
    a user interface operatively coupled to the scannable code management server configured to allow a user to define the criteria for generating the change event triggers, wherein the user interface comprises input mechanisms for receiving and processing user inputs relating to the criteria;
    combining brand protection and counterfeit abatement and further comprising:
    packaging or tags supporting one or a series of QR codes or their equivalents adapted to direct a user, upon scanning of a code, to a standard URL or generated personalized URL to a first website or location;
    a QR code management system adaptable to track scans of said QR codes, said QR code management system may be adapted to provide reporting of scanning information tracking data; and
    a first website or location; and
    utilizing the scanning information for tracking data of a product item related to the packaging, stickers or tags embedded within one or more scannable codes.

2. The method of claim 1, wherein said user-definable criteria further form change event triggers selected from a group consisting of: a scan count or number of scans; a first date of scan; a date range; a day of the week; a hardware-based authentication mechanism incorporating a combination of a unique scanned code and user-entered data; and a combination of elements of the group.

3. The method of claim 2, wherein said scannable code is a QR Code, and the user-entered data is obtained from a secure scratch-off indicia.

4. A method for operating a promotion comprising:
obtaining a tangible hardware-based system for redirecting scannable codes according to claim 2; and
utilizing the any of said change event triggers.

5. The method of claim 4, wherein:
each of said scannable codes functions as a serial number each assigned to an individual item; and
one or more change event triggers are applied to one or a group of scannable codes.

6. The method of claim 5, wherein a selected serial number initiates a change event trigger differently than change event triggers of the remaining serial numbers.

7. The method of claim 5, wherein each of said one or more change event triggers are grouped into separable projects performing different actions upon being scanned.

8. The method of claim 5, wherein:
each of said scannable codes functions as a serial number each assigned to an individual item; and
a selected serial number or set of serial numbers is identified as a winning number for initiating a change event trigger for redirection to a contest web page;
wherein said selected serial number or set of serial numbers are randomly selected or non-randomly selected.

9. The method of claim 2, wherein at least one said change event trigger is obtained from a database.

10. The method of claim 1, wherein said packaging or tags supporting one or a series of scannable codes are preprinted, and said change event triggers are created and assigned later.

11. A system for redirecting scans of scannable codes, comprising:
items or media equipped with one or a series of scannable codes designed to direct a user to either a standard URL or a dynamically generated personalized URL leading to a designated digital platform or location;
a scannable code management system server comprising a processor and memory, the scannable code management system server configured to:
automatically track, in real-time, scans of the scannable codes;
analyze aggregate scanning patterns and user interaction data;
store scanning information in a secure database;
generate and provide real-time analytics based on the scanning patterns and user interaction data; and
dynamically modify redirection paths based on the analyzed scanning patterns and user interaction data; and
automatically implement change event triggers based on predefined scanning threshold conditions detected from the analyzed patterns;
a network interface on the scannable code management system server configured to:
automatically redirect users to different digital destinations in response to detected scanning patterns and trigger conditions;
transmit real-time notifications when scanning thresholds are met; and
provide secure API integration with external systems; and;
wherein the digital platform is dynamically reconfigured in real-time based on the analyzed scanning patterns and user interaction data, such that the system provides technical improvements in scannable code management through automated pattern detection and dynamic response.

12. The system of claim 11, wherein the predefined scanning threshold conditions comprise user-definable criteria including scan frequency, scan timing, geographical data, user interaction patterns, and combinations thereof, allowing for diverse applications such as interactive marketing, educational content delivery, personal identification, and access control.

13. The system of broadened claim 11, where the scannable code is a QR Code, and additional user information can be captured through various means, including but not limited to scratch-off indicia, user input, or other change event trigger, broadening the scope of interaction and data collection.

14. A method comprising:
utilizing the system of claim 12, where the automatic redirection based on the analyzed scanning patterns and user interaction data enables dynamic engagement strategies, including time-sensitive promotions, sequential content unlocking, or user journey tracking across different platforms.

15. The system of claim 11, where:
each scannable code is associated with a unique identifier, facilitating item-specific interactions, and
said change event triggers can be applied to individual or groups of items, supporting customized actions such as loyalty rewards, product authentication, and personalized user experiences.

16. The system of claim 15, wherein specific identifiers can initiate unique change event triggers, providing the ability to distinguish between different user actions or item interactions, enabling targeted responses or actions.

17. The system of claim 15, where change event triggers are organized into distinct projects, each designed to perform specific actions upon scanning, allowing for the system's application in varied contexts such as event management, educational campaigns, and community engagement.

18. The system of claim 5, where selected identifiers mark items as part of a promotional campaign, directing users to specialized content or experiences, such as contest participation, with identifiers being selected through random or strategic methods.

* * * * *